United States Patent [19]

Stegemeier et al.

[11] Patent Number: 5,553,189

[45] Date of Patent: Sep. 3, 1996

[54] RADIANT PLATE HEATER FOR TREATMENT OF CONTAMINATED SURFACES

[75] Inventors: George L. Stegemeier; Harold J. Vinegar; Frederick G. Carl, Jr., all of Houston, Tex.

[73] Assignee: Shell Oil Company, Houston, Tex.

[21] Appl. No.: 324,950

[22] Filed: Oct. 18, 1994

[51] Int. Cl.[6] .................................................. H05B 3/34
[52] U.S. Cl. .......................... 392/422; 392/432; 392/435; 219/213; 219/535
[58] Field of Search .................................. 392/422, 432, 392/435, 436; 219/213; 422/22; 405/128, 130, 131; 34/92; 165/45

[56] References Cited

U.S. PATENT DOCUMENTS

| | | | |
|---|---|---|---|
| 4,310,745 | 1/1982 | Bender | 219/213 |
| 4,421,048 | 12/1983 | Adema et al. | 114/222 |
| 4,677,279 | 6/1987 | Wesseltoft | 219/345 |
| 4,890,673 | 1/1990 | Payne | 166/266 |
| 4,973,811 | 11/1990 | Bass | 219/635 |
| 4,984,594 | 1/1991 | Vinegar et al. | 134/21 |
| 5,011,329 | 4/1991 | Nelson et al. | 405/128 |
| 5,028,760 | 7/1991 | Okuyama | 392/435 |
| 5,076,727 | 12/1991 | Johnson et al. | 405/128 |
| 5,114,497 | 5/1992 | Johnson et al. | 134/21 |
| 5,127,343 | 7/1992 | O'Ham | 110/233 |
| 5,169,263 | 12/1992 | Johnson et al. | 405/128 |
| 5,190,405 | 3/1993 | Vinegar et al. | 405/128 |
| 5,193,934 | 3/1993 | Johnson et al. | 405/128 |
| 5,209,604 | 5/1993 | Chou | 405/128 |
| 5,221,827 | 6/1993 | Marsden, Jr. et al. | 219/200 |
| 5,223,697 | 6/1993 | Wilde et al. | 219/464 |
| 5,229,583 | 7/1993 | van Egmond et al. | 219/549 |
| 5,233,164 | 8/1993 | Dicks et al. | 219/528 |
| 5,244,310 | 9/1993 | Johnson | 405/128 |
| 5,261,765 | 11/1993 | Nelson | 405/128 |
| 5,265,978 | 11/1993 | Losack | 405/128 |
| 5,271,693 | 12/1993 | Johnson et al. | 405/128 |
| 5,316,411 | 5/1994 | Buelt et al. | 405/128 |
| 5,318,116 | 6/1994 | Vinegar et al. | 166/60 |

FOREIGN PATENT DOCUMENTS 419618  11/1934  United Kingdom .................. 392/432

*Primary Examiner*—Teresa J. Walberg
*Assistant Examiner*—J. Pelham

[57] ABSTRACT

A method and apparatus are provided for remediation of near surface soils, pavements and other surfaces using a radiant heating plate, an insulating layer, and a vapor barrier above the radiant heating plate and below the insulation. The radiant heating plate transfers thermal energy to the surface primarily by radiation and therefore need not be in contact with the surface over large areas. The radiant heating plate may also serve as a vacuum barrier for collecting contaminant vapors emanating from the subsurface soil.

2 Claims, 10 Drawing Sheets

RADIANT PLATE HEATER FOR TREATMENT OF CONTAMINATED SURFACES

FIELD OF THE INVENTION

This invention relates to a method and apparatus for removal of near surface contaminates.

BACKGROUND

Shallow contamination of soil, and of paved surfaces, by persistent chemicals is a widespread problem arising from many human activities. Frequently, chemical compounds are spilled or placed on the surface of soils for dust or weed control, or for other agricultural purposes. Under these circumstances, the materials are often spread over very large areas. If the chemicals are judged to be detrimental to human health or need to be dealt with for other reasons, the task of removing them or remediating the site is formidable. If the contaminating chemicals are sufficiently insoluble in water, they will not be leached into the soil by downward percolating rainwater, but will remain very near the surface for many years. Even with agricultural activities, such as ploughing, discing, and harrowing, these contaminants will seldom be carried as deep as a foot and usually will remain in the upper few inches of the soil.

The most direct method of remediating a shallow, contaminated site is to simply remove the soil by digging it up and carrying it to a disposal site. Disturbance in the soil by excavation produces dispersion and secondary contamination. When dry, this occurs by windblown dust, and when wet, by rutting and other deep mixing of the soil. Because excavation with large equipment can spread the contamination into the soil, additional clean soil must be taken to assure complete removal of the contaminants. Furthermore, the transport of the offending chemicals to another location does not solve the overall problem because the new site becomes a potential problem and a continuing liability to the original operators.

Some other previously employed methods address the necessity of destroying the contaminants; however, most of these methods also require: (1) excavation, (2) transport to a treatment facility, (3) some other means of destruction or removal from the soil, and (4) finally return of the soil to the original location. All of these methods suffer the hazards of secondary contamination from dusty excavations and process plant operations, such as incineration. This is of particular concern if there is nearby habitation.

Other previously employed methods include bioremediation or treatment of the soils by some kind of chemical washing. These methods are not widely used because they have not proven to be sufficiently effective in removing contaminates to the extremely low levels of residual concentration generally required. This is particularly a problem if the contaminates are highly toxic or carcinogenic.

U.S. Pat. No. 4,984,594 discloses a method whereby the soil is heated in-situ to remove contaminants. Volatile substances in the soil are vaporized by the heat and drawn upward and gathered into a vacuum system where they are condensed in traps for subsequent treatment (e.g. incineration), or disposal. Soil heating is effected by means of an areal electric heater that is placed upon the soil surface. The heater, which is a mesh of electrically-conductive wires, is in good contact with the soil. Heat is transferred into the soil by thermal conduction. A permeable layer may be placed above the heater if the wire mesh does not provide a sufficient conduit for horizontal transport of gases to a central vacuum port. A layer of high temperature insulation is placed above the heater/permeable layer, and above that is placed a flexible, but impermeable silicone rubber sheet. A vacuum port in the impermeable sheet is connected to the collection/condensation system or to an incinerator. Another, more durable, heater is disclosed in U.S. Pat. No. 5,229,583. This heater consists of a metallic furnace belt with tubular electric heating elements inserted between the rungs of the belt. Compared to the previous design, the furnace belt (1) allows the heater to be rolled or dragged from one location to another, (2) provides a highly permeable path for vapor flow, and (3) distributes heat laterally between the heating elements.

Another heater blanket design, disclosed in U.S. Pat. No. 5,221,827, incorporates a ceramic beaded conductive wire heater that is "floatingly pinned to a layer of ceramic fiber insulation." This design includes two additional layers of insulation, a rigid stainless steel support frame, and an impermeable canopy over the support frame over the heater.

Any of the heater blankets for in-situ remediation that are cited above are capable of removing contaminants from a small, flat, test site, such as the one described in U.S. Pat. No. 5,229,583. In practice, however, soil surfaces are often uneven so that heat transfer is poor wherever the heater does not touch the soil surface. Because soil is a relatively poor thermal conductor, the spread of heat laterally is also slow. This limits the rate at which heat can be transferred to the soil without overheating the mineral insulated heating elements, and requires closely spaced heating elements, resulting in increased costs. Another problem of the prior art heaters is that of overheating of the silicone rubber vacuum sheet. This is a troublesome operational hazard that will reduce the temperature at which the surface heater can be reliably operated. Still another problem is that the insulating layer between the heater and the vacuum sheet tends to be compressed by atmospheric pressure, thereby reducing its insulating capacity. Yet another disadvantage is that the large quantities of water vapor emanating from the soil tend to condense in the insulation, particularly around the circumference, resulting in a soggy insulation which may contain contaminants. For large scale applications, both mechanical and economic constraints limit the use of the prior art designs.

It is therefore an object of the present invention to provide a heater and a method to use such heater that is less expensive and will also conserve electrical power through increased thermal efficiency. It is another object to provide such an apparatus and method that can be easily moved from location to location.

SUMMARY OF THE INVENTION

These and other objects are accomplished by a method to remove contaminates near a contaminated surface, the method comprising the steps of:

providing a radiant plate surface heater for remediation of contamination near a surface, the heater comprising, a) a continuous metal sheet effective to radiate heat to the contaminated surface, b) a means for heating the continuous metal sheet, c) insulation occupying a volume above the continuous metal sheet, and d) a vapor barrier effective to prevent significant leakage to a volume between the continuous metal sheet and the surface from the volume occupied by the insulation;

placing the radiant plate surface heater above the surface from which contaminates are to be removed;

heating the contaminated surface using the heater;

removing vapors from below the continuous metal sheet at a rate sufficient to maintain a vacuum below the continuous metal sheet;

removing contaminates from the vapors removed from below the continuous metal sheet; and venting vapors removed from below the continuous metal sheet to the atmosphere after contaminates are removed therefrom.

An apparatus provided in the first step described above constitutes a further aspect of the present invention.

A thermal oxidizer is preferably provided to oxidize contaminates from the vapors removed from below the continuous metal sheet. The thermal oxidizer's function is to destroy any contaminant that survives the high temperature of the heater blanket and the underlying hot soil. For this reason the thermal oxidizer's main role occurs during this early period when contaminants are volatilized but the soil and blanket heater are not hot enough to destroy them. One configuration of the thermal oxidizer is a series of baffled tubes with high temperature heating elements located concentrically in a group of parallel inlet tubes. The flow path is designed to provide adequate residence time to destroy any contaminant entering the vessel. When the oxidizer reaches its operating temperature, the blanket heater, which may consist of a plurality of heating elements, is preferably activated to heat the continuous metal sheet to radiant temperatures.

A reflector plate may be positioned under the insulation layer and above and preferably essentially parallel to the continuous steel plate. This reflector plate is preferably a steel plate that is effective to either reflect or reradiate heat from a source of heat located between the reflector plate and the continuous metal sheet. These parallel steel plates, with a heat source between them, provide an efficient "black box" radiator that distributes the heat horizontally between the heater elements. Heat is transmitted to the soil surface largely by radiation, and into the subsurface by thermal conduction. For irregular soil surfaces, radiant heating provides good heat transfer from the plate without direct contact with the soil. The plate also laterally distributes overheating resulting from heater hot-spots or localized combustion of surface vegetation. Throughout the remediation, the gas stream temperature in the vacuum system downstream of the oxidizer is maintained at a temperature sufficient to avoid condensation of any produced products, thus, all effluents to the atmosphere are in the gaseous state.

During a heating cycle, contaminants in the soil are vaporized and vacuumed to the surface through successively hotter layers of soil. The continuous metal sheet contains these vapors and allows for collection at the inlet to the oxidizer. The thermal oxidizer may be connected integrally with the heating plate. This arrangement utilizes all of the heat from the gaseous stream leaving the blanket heater, and thereby minimizes energy requirements for the system. In another configuration, the thermal oxidizer may be constructed by baffling the flow of gases from the soil layer adjacent to the continuous metal sheet. This arrangement could consist of a metal plate underlying the continuous plate in the vicinity of the vacuum port. The underlying plate diverts the stream of gases arising from the soil outward from the center of the sheet, and then returns the process stream past the high-temperature, heater-sheet to the center port.

The heating means for the blanket may be mineral-insulated electric heating elements or suspended nichrome wires. The preferred location of the heating elements is above the continuous metal sheet for protection of the heating elements during moving and operation. Direction of heat downward may be enhanced by optimizing the shapes of the metal plate reflectors above the heaters. These reflector plates may also be devised to serve as a vapor barrier to the upward flow of contaminants and water vapor.

Heat may also be supplied by concentric tube gas heaters that are arranged in a network to evenly distribute heat over the areal extent of the blanket. The thermal oxidizer may also be heated by gas combustion inside small tubes that radiate thermal energy to the process gas stream.

Placing the insulation layer above the metal vacuum barrier rather than below it, as in previous designs, is desirable because contamination of the insulation by the process stream is avoided. This arrangement also avoids compaction of the insulation and permits the use of very thick, low-density insulation layers. One type of insulating material preferred for its low cost and safety is expanded vermiculite, a low-density, natural clay mineral. If loose insulation is used, containment trays can be incorporated into the reflector plates.

If the gap between the soil and the continuous sheet is too small to allow adequate gas flow, it may be necessary to place an open, woven-wire mesh layer, or some other means of separation, under the continuous metal sheet in order to provide a path for the flow of gases under the metal sheet. The wire 10 mesh layer could be moved independently from the rest of the heater blanket assembly. When placed on the soil surface, the wire mesh would also facilitate sliding the heater assembly over the ground while moving from one remediation position to the next.

The present design has an inherent potential to economize the use of power, delivering more heat to the contaminated near surface soil and wasting less heat to the atmosphere and to the soil below the depth of contamination.

The present invention may also optionally be practiced by removing contaminated soil from an initial location and spreading it on a relatively flat surface for remediation by an apparatus according to the present invention. Remediated soil may then be placed back in the initial location. The relatively flat surface is preferably prepared so that it is insulated and includes a vapor barrier below the surface, thus significantly reducing the energy required to remediate the soil.

The surface from which contaminates may be removed according to the present invention may be a soil surface, pavements, foundations, flooring, or even walls or ceiling surfaces.

DETAILED DESCRIPTION OF THE INVENTION

Figure 1:
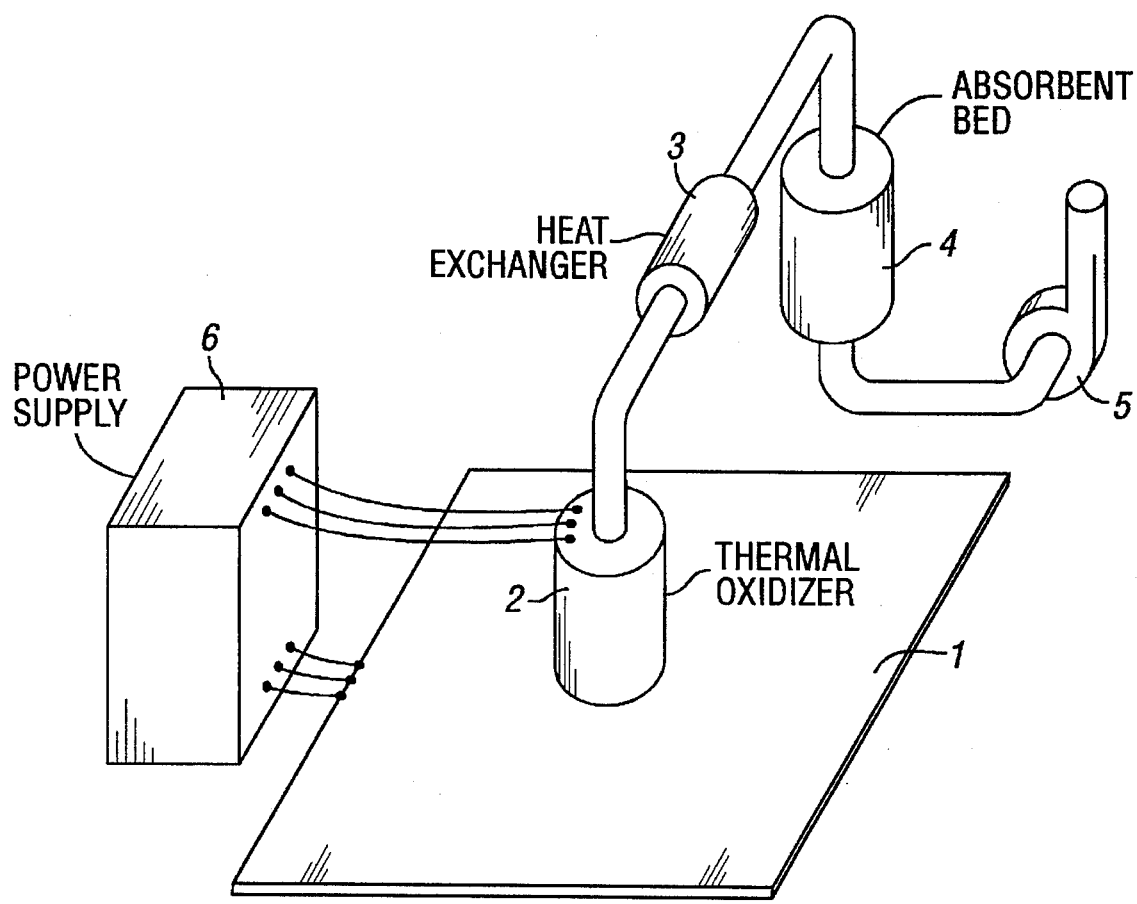
FIG. 1 is a schematic drawing of equipment used in the radiant plate soil remediation process.

Referring now to FIG. 1, a preferred arrangement of the major components of this remediation system are shown. A radiant blanket heater assembly 1, an in-line thermal oxidizer 2, a heat exchanger 3, an adsorbent bed 4, a vacuum pumping device, or blower, 5, and a power supply 6, are shown. Depending on the types of contaminants and remediation conditions, some of the major components, such as the external thermal oxidizer 2, the heat exchanger 3, and the adsorbent bed 4, may be not be necessary.

Figure 2:
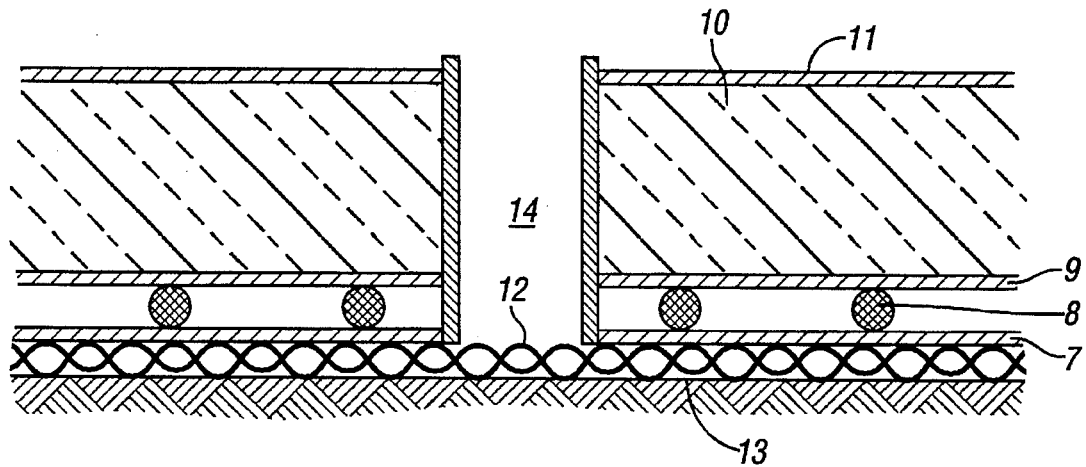
FIG. 2 is a cross-sectional view of the elements of a radiant plate heater blanket.

Referring now to FIG. 2, a radiant blanket assembly is shown to contain the following elements, layered from bottom up: (a) a continuous stainless steel plate 7, resting on the soil surface 13, (b) long, mineral insulated tubular electric heaters 8, loosely attached to the upper side of the sheet in a parallel arrangement, (c) a thin sheet stainless steel reflector 9, covering the heater rods, (d) a thick layer of loose mineral insulation 10, and (e) a weatherproof cover 11.

Steel Plate Vapor Barrier

A thin stainless steel plate 7 serves as a vapor barrier and as a vacuum seal on the soil, and as a distribution source of radiant heat. The metal sheet may be composed of any high temperature metal, for example, 304, 309, 310, 314, or 316 stainless steel, INCONEL 600, 601, 602CA, INCOLOY 800H, or other high temperature alloys. Because the surface plate will generally be moved only when cold, the main requirement in the choice of the alloy is not its strength but rather its resistance to thermal oxidation at high temperature. Stainless steel 304 is most preferred because of its relatively low cost and good performance at temperatures to 1800° F. The thickness of the plate is normally between about 1/16" and 1/8" although thicker or thinner plates are acceptable. Thicker plates are more robust and will be capable of more operating time, but will be heavier and more costly. Mill plates and steel sheets are manufactured in standard widths up to six feet.

The radiant plate 7 need not have a smooth surface, but could be dimpled, muffin-tinned, or bellowed to allow for differential expansion on heating. The plate need not contact the soil but could be placed over a metal belt, chain-link fencing, or metal mesh 12, to improve air flow under the plate and to facilitate sliding the plate from one location to the next.

Lateral heat transfer within the radiant heater plate can be improved by using a composite structure with one layer having a very high heat conductivity. For example, copper or aluminum plate can be sandwiched between stainless steel layers and welded around the circumference to make a vacuum tight seal. The stainless steel provides the oxidation resistance at high temperature while the copper or aluminum provides enhanced lateral thermal conductivity. For example, copper has thirteen times the thermal conductivity of stainless steel at 1800° F. Good lateral heat transfer in the radiant heater plate minimizes problems associated with heater element hot spots resulting from non-contact with the soil or from localized combustion of vegetation at the soil surface.

To build large heater blankets, the individual plates can be welded together to form a large continuous sheet. Alternatively, the plates can be sealed by a mechanical fastening. In that case it may be advisable to bend the edges upward at right angles and make the weld or seal several inches above the flat, heated floor of the sheet. With this type of design, the plate also becomes a tray, holding the heaters, the reflectors, and the insulation. A vacuum port 14 is located at the center of the sheet. For large blankets, several vacuum ports may be needed, each preferably serving approximately 100 to 1000 square feet of the blanket.

Heaters

In a simple embodiment of this design, long electric heaters 8, are positioned in parallel arrays on, above, or below the base metal sheet 7. The heaters may be the mineral insulated type, with a core conductor, magnesium oxide insulation, and an oxidation resistant sheath. The core may be either of the helical type found in cal-rod type heaters, or a straight conductor found in heat tracing type heaters. The conductor alloy can be, for example, NICHROME, CONSTANTAN, MIDLOHM, .LOHM, or other nickel, chromium, or copper-nickel based high temperature alloys. The insulation can be any mineral insulation such as MgO, $Al_2O_3$, BeO, etc. The sheath material may be stainless steel, INCONEL or INCOLOY, or another high temperature alloy. The most preferred elements have either a NICHROME of CONSTANTAN core, MgO insulation, and INCONEL 600, 601, or 602CA sheath. Appropriate heaters of the helical type are sold commercially by Chromalox Corp. Pittsburgh, Pa., while those of the heat tracing type are sold by BICC Thermoheat Corp. of Newcastle, U. K. These heaters are made by a continuous weld-fill-draw process which improves the reliability and reduces the cost of the heating elements. Heaters of this type are manufactured as long as 200'. Both longer elements and wider spacing will minimize the number of electrical connections and improve the reliability of the whole heater array. Depending on the blanket sizes selected, the long heaters can be looped back and forth since they can be safely bent in a U-shape to several inches in diameter. The heaters may be loosely fastened with metal clips to the upper side of the radiant plate to allow thermal expansion of the heaters but to prevent them from moving across each other. The electrical heaters may also be located below the radiant plate; however, the upper location is preferred to (1) protect the heaters when moving the plate, (2) shield them from potentially damaging vapors during the heating process, and (3) allow easy replacement.

Figure 3:
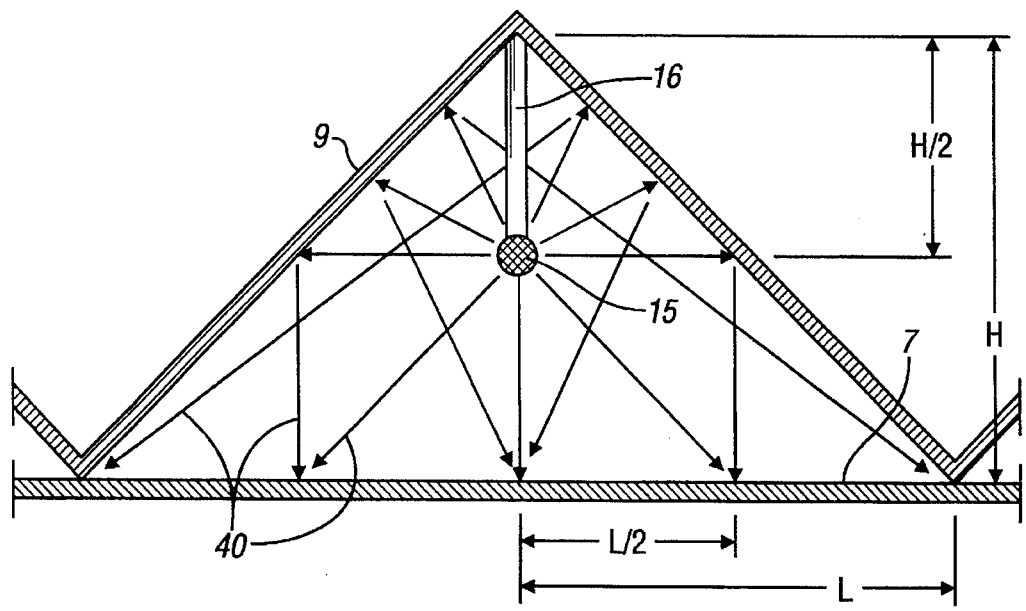
FIG. 3 is a graph of the reflection of heat to a flat plate from parallel spaced heaters placed between the plate and a shaped reflector.

Alternatively, as shown in FIG. 3, the heaters may be suspended from the "reflector" plate 9 above the base plate 7. In that arrangement, bare nichrome or similar alloy resistance wires 15, could be used in place of the mineral-insulated heaters. The bare wires may be suspended from ceramic insulators 16 to isolate them electrically from the metal plates.

Typically, sets of three heaters are connected to provide three phase electrical power from a "Delta" or "Y" configuration.

Figure 4:
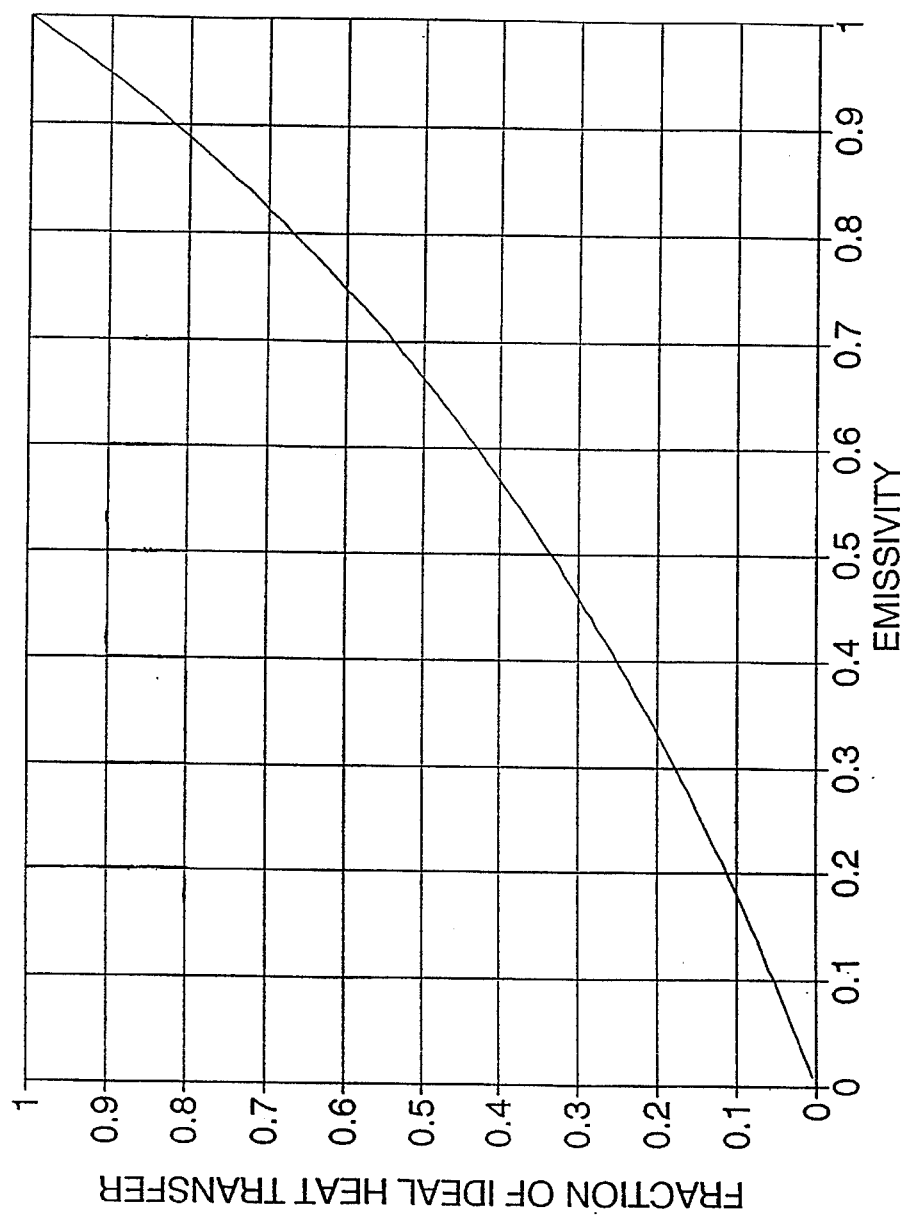
FIG. 4 is a graph of the relative efficiency of a radiant heater as a function of the emissivity.

When the heaters are operated at temperatures where radiation heat transfer becomes important (greater than 1500° F.), the region between the lower plate 7 and the reflector 9 becomes an efficient black box radiator, which evenly distributes the heat across the surfaces between the parallel heaters. This occurs because the emissivity of oxidized stainless steel is about 0.95. Although it may not conform closely with the ground, the heater plate will radiate energy across space, making it useable on irregular surfaces or over low obstacles such as flush-cut tree stumps. Radiant transfer to the soil is also highly efficient because the emissivity of quartz, a major component of most soils, is also about 0.95. FIG. 4 illustrates the relative efficiency of heat transfer from a surface heater 7 to the soil surface 13 as a function of an average emissivity. The difference in temperatures between the plate heater and the soil, or the heat flux at a temperature difference, may be calculated by the Stephan-Boltzmann equation for radiation heat transfer between parallel surfaces:

$$Q = S(T_1^4 - T_2^4)\left(\frac{1}{\frac{1}{e_1} + \frac{1}{e_2} - 1}\right) F \tag{1}$$

where,

Q is the heat transfer rate per unit area [BTU/hr/ft$^2$]

S is the Stephan-Boltzmann constant =0.1714*10$^{-8}$ [BTU/hr–ft$^2$–°R$^4$]

$T_1$ is the heater plate temperature [°R]

$T_2$ is the soil surface temperature [°R]

$e_1$ is the emissivity of the heater plate $e_2$ is the emissivity of the soil surface F is the shape factor (1.0 for parallel surfaces)

Thermal conductivity of the soil generally limits the amount of heat that can be conducted into the soil at a maximum soil surface temperature. Typically, only about 500 watts per square foot can be expected after semi-steady state heating is reached.

Figure 5:
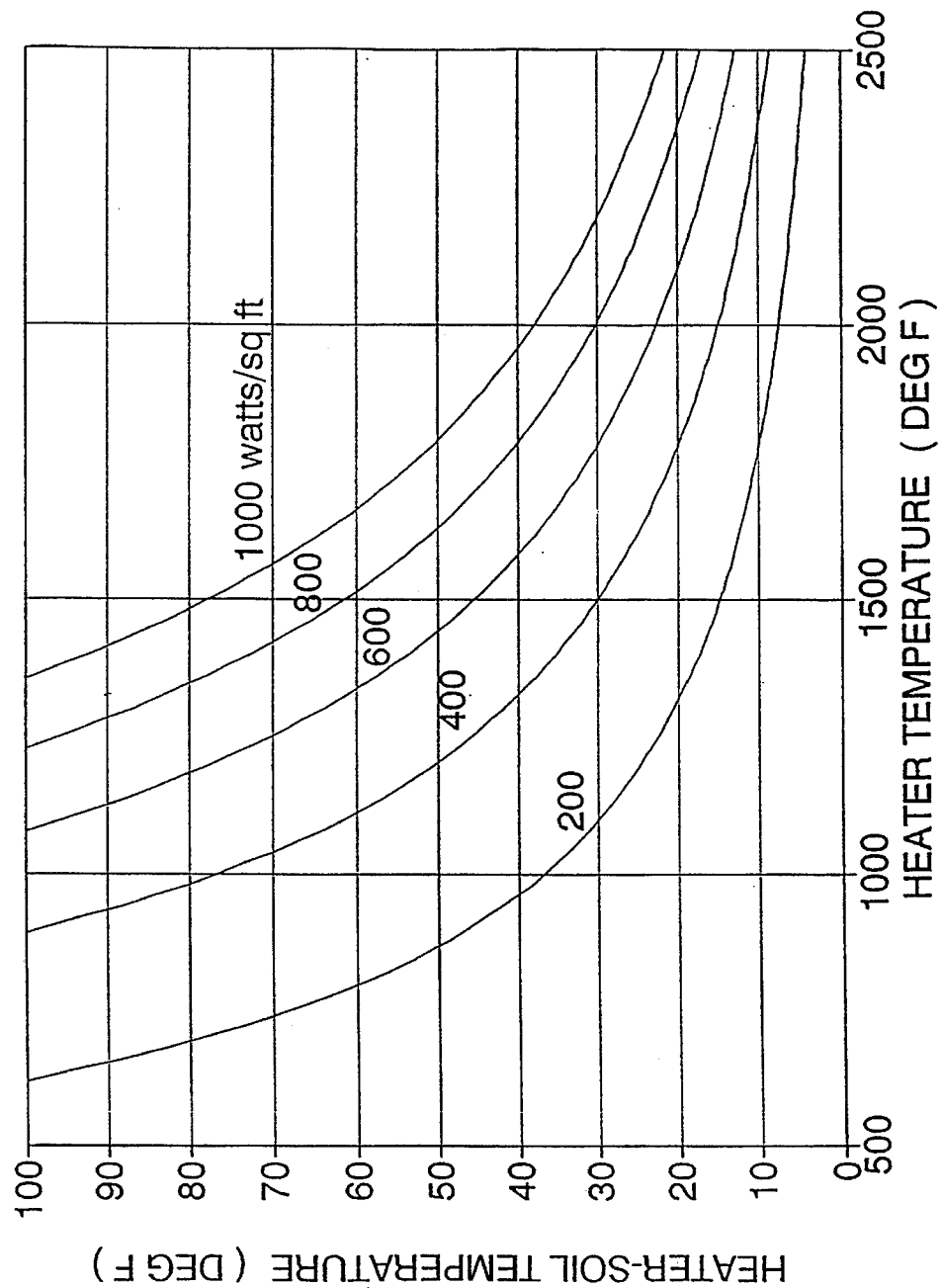
FIG. 5 is a graph showing the temperature drop between the radiant heater plate and the top of the soil, as a function of the heater temperature.

Referring now to FIG. 5, it is illustrated that at heater temperatures above 1500° F., sufficient heat can be transferred to the soil with a temperature difference between the heat source and the ground of less than 50° F.

Compared to prior art designs, the radiant heater of the present invention is capable of providing more uniform heating with considerably wider spacing between the heaters; however, for an efficient radiant heater, the additional requirement of heating rate per square foot of surface area will dictate the heater spacing. This occurs because the watt loading per square inch of sheath limits the amount of heat that a heater can deliver per unit length. Depending upon the heating applications and the heater type used, the heater element spacing may range from three inches to thirty-six inches. For a ⅜" diameter heater rod, a heater spacing of nine inches will deliver up to 1000 watts per square foot.

Although the preferred embodiment utilizes electric heaters, combustible gas burners may also be utilized as the primary source of thermal energy, both for the radiant plate and for the thermal oxidizer. Long gas heaters for the radiant plate may be fabricated from slender concentric tubing and arranged to provide radiant heat in patterns similar to the parallel arrays of the electric heaters. Appropriate combustible gases could be, for example, natural gas, methane, propane, butane, or others. Combustible gases have the advantage in terms of cost, and in availability in locations where electrical power is not accessible; however, control of temperature over a large area radiant plate is more difficult with gas fired heaters than with electrical heaters.

Reflector Plates

The upper stainless-steel reflector sheet 9 may be made from thin stainless steel sheets. The reflector serves two purposes: (1) it separates the heaters from the insulation, thereby maintaining a space between the plates in order to allow radiant heating across the surface, and (2) it may be used to suspend the heaters 15 above the lower plate 7. In a less complex embodiment, the reflector is a flat plate, approximately ⅟₃₂" thick, parallel to the lower plate 7. The behavior of this radiant heat transfer is dependent upon the temperature, the geometry, and other factors. As discussed previously, at high temperatures the entire region between the plates will act as a single "black body", thereby efficiently radiating heat laterally between the heaters. In lower temperature applications it would be advantageous to reflect heat from the upper surface by making that surface reflective and by bending the reflectors into more efficient shapes. Referring now to FIG. 3, a 90 degree fold in the reflector is shown along with examples of paths of radiant heat transfer, 40. This reflector plate can be used to distribute heat more effectively to the region between the heaters. In addition to the shape of the reflector, an optimum geometric configuration can be obtained by varying the height that the heaters are suspended above the lower plate. In some applications it will be advantageous to build reflectors and heaters as modular units about four to five feet wide, but extending the length of the blanket. These modules could be removed individually and replaced in the event of a heater failure.

Insulation

Compared to prior art designs in which the insulation was placed below an impermeable sheet, in the present invention, a vapor seal below the insulation prevents contamination of the insulation by condensates produced from the soil. The placement of insulation 10 external to the vapor flow also eliminates a difficult temperature control problem which exists at the silicone rubber sheet in many prior art designs. With the insulation inside the contaminant flow region, the temperature at the top of the insulation layer immediately under the rubber sheet must be maintained at a temperature above the boiling point of the contaminant in order to avoid condensation. This temperature, however, must be below the temperature that would damage the rubber sheet. In many instances, there is a narrow range of permissible temperatures. Furthermore, maintaining high temperatures at the top of the insulation results in large heat losses to the atmosphere. For example, more than 50% of the total electrical energy used to heat the soil may be lost to the atmosphere when the top sheet is maintained at 550° F. In the present invention, the thermal efficiency can be greatly improved by adding a thick layer of insulation over the metal sheet and maintaining low temperatures at the top of the insulating layer 10.

Because the insulating layer 10 is placed above the vacuum seal 7, the present invention no longer requires a high compressive strength insulation, which was needed in the previous one. This permits the use of an inexpensive, low-density insulation 10, such as expanded vermiculite or perlite. A six to eight inch thick layer has been shown to be adequate although thicker or thinner layers may be required, depending on the remediation conditions. Vermiculite is stable at 1600° F., but is considerably altered at 2000° F. If heater temperatures greater than about 1800° F. are used, a thin layer of a higher temperature insulation, such as aluminosilicate, diatomite, or perlite, can be used to protect the vermiculite. Granular clay mineral types of insulation that do not form hazardous cristobalite upon heating are preferred over fibrous forms of high temperature insulation.

Vermiculite insulation may also be size-graded to minimize heat loss through the vermiculite. Denser, smaller particle size vermiculite is a better insulator for higher temperatures, where radiant heat transfer is a significant mechanism. This vermiculite can be placed on the bottom of the graded bed. Vermiculite of decreasing density could be placed on top of the more dense vermiculite. The less dense vermiculite is a more effective insulator at lower temperatures.

Loose-fill insulation such as graded vermiculite may be held in trays made by bending upright walls on the reflectors. Another alternative is to make large modular sections of insulation bags or batts that are placed individually on the reflector surface 9. The bags may be constructed either of metal mesh (stainless steel or Inconel), or ceramic cloth. Metal mesh is preferred for durability.

Weatherproof Cover

A weatherproof cover 11 is preferably provided over the insulation 10 at the top of the heater blanket assembly to protect the insulation 10 and heaters 8 from inclement weather. The weatherproof cover also may serve to contain loose-fill insulation. The weatherproof cover 11 may be made of any tarpaulin material, or of light aluminum roofing.

Perimeter Vacuum Seal

Figure 6A:
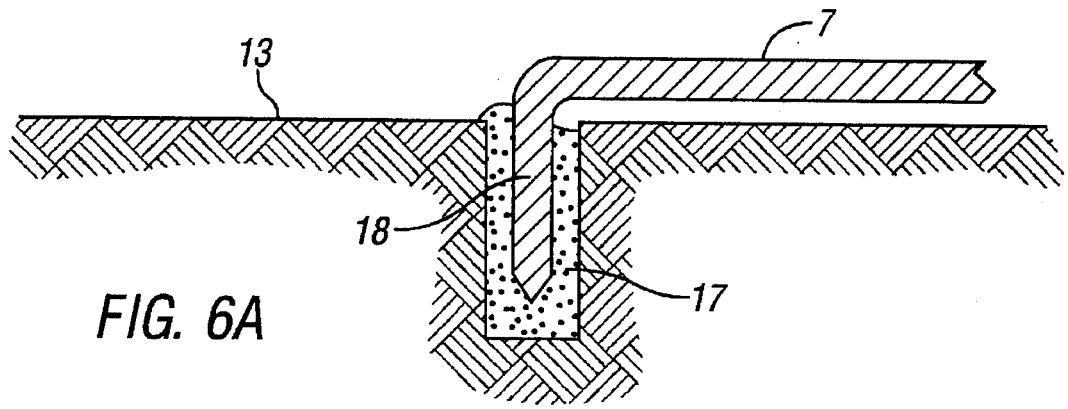
FIGS. 6A through 6C show details of vacuum seals at the edge of the plate.
Figure 6B:
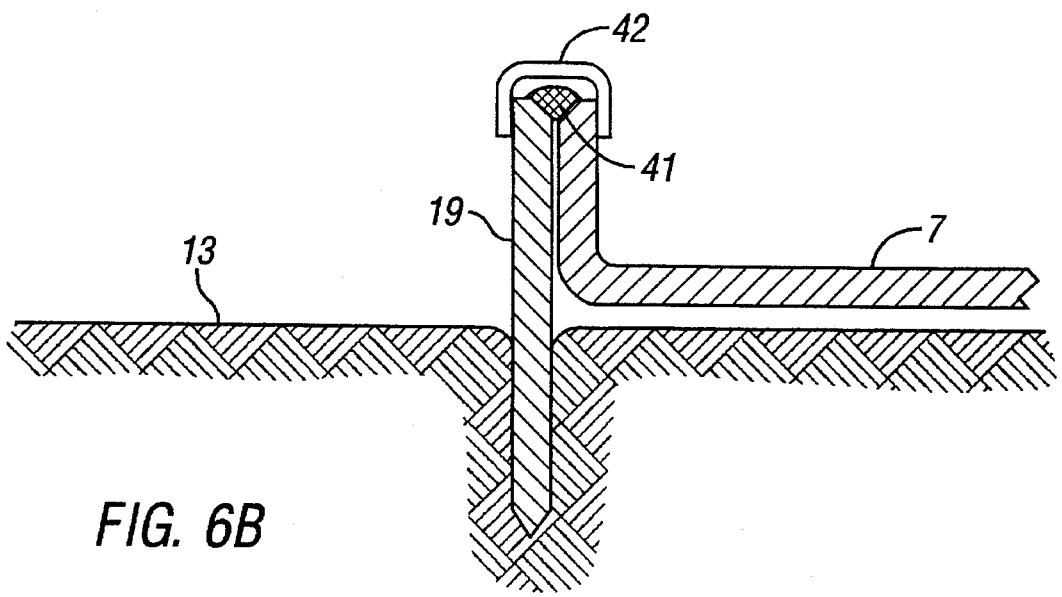
Figure 6C:
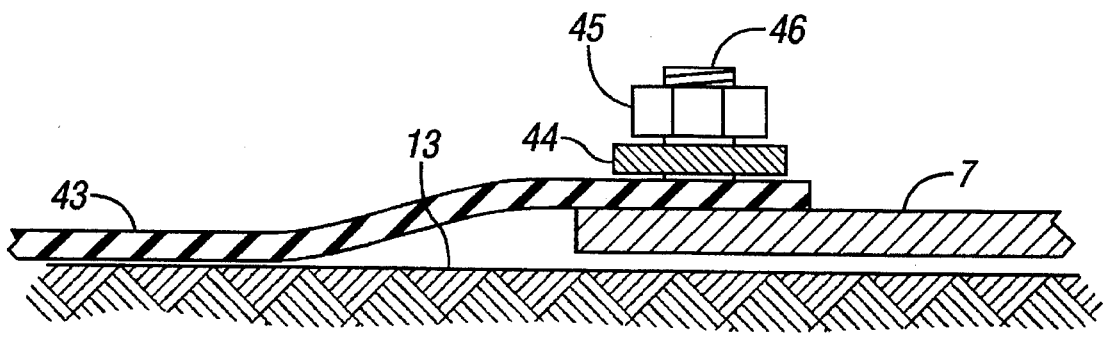
Figure 7A:
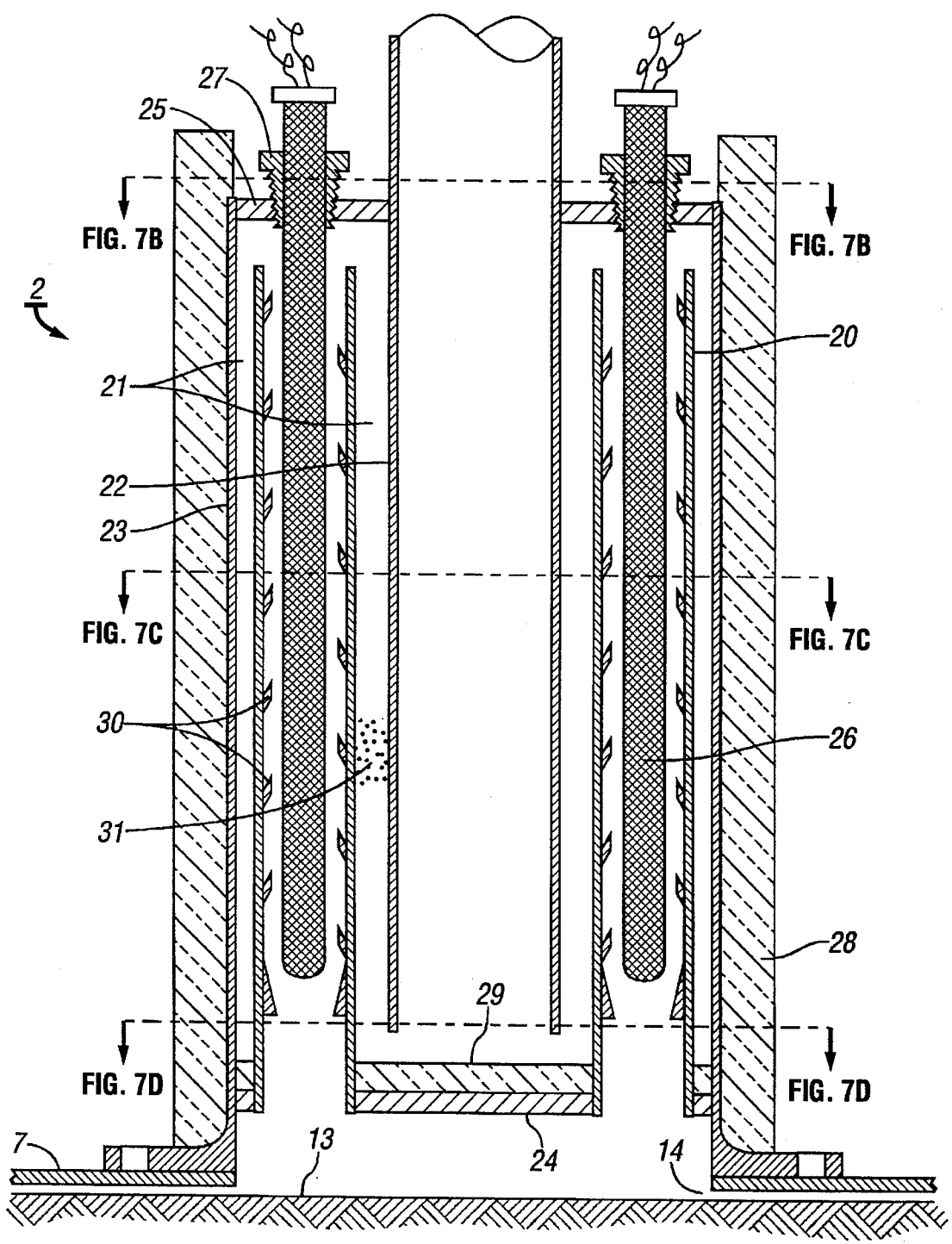
FIGS. 7A through 7D are sectional views of a preferred thermal oxidizer.
Figure 7B:
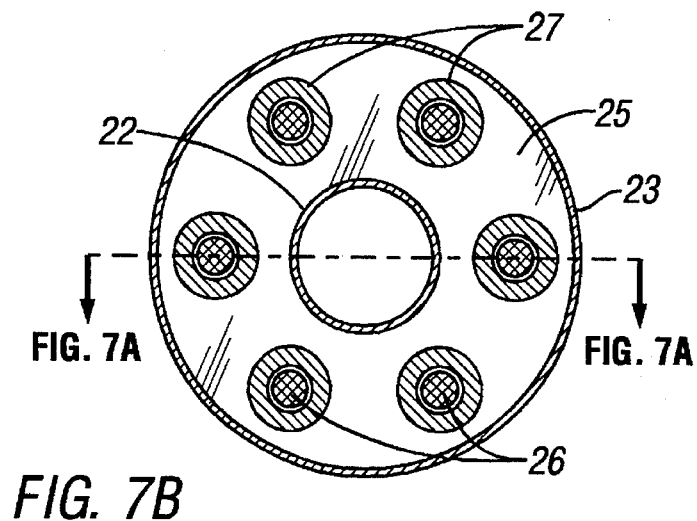
Figure 7C:
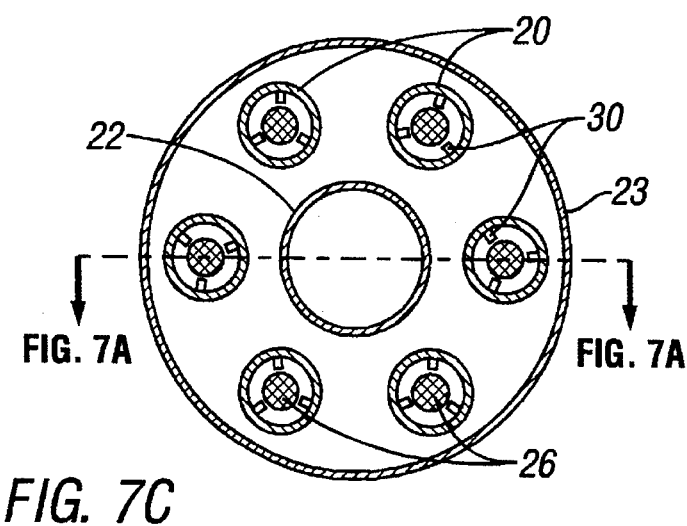
Figure 7D:
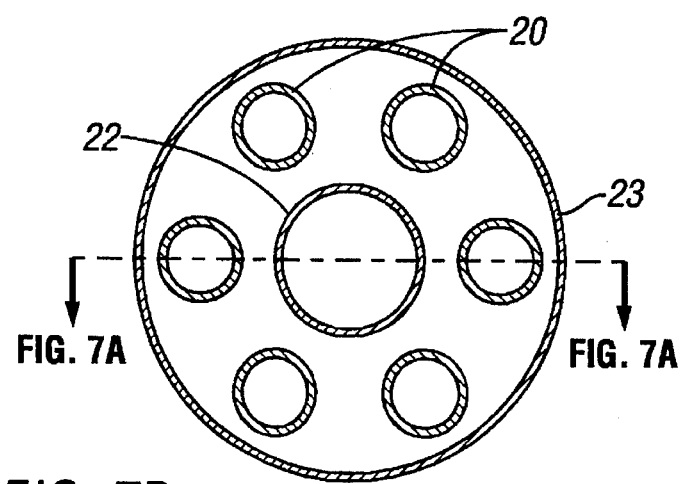

At the edge of the blanket, a means to seal the vacuum is preferably provided to prevent excessive air leakage into the process stream. Referring now to FIGS. 6A through 6C preferred methods of effecting an edge seal are illustrated. A narrow, shallow groove 17, for example, one to four inches deep, may be excavated with an edging tool around the perimeter of the lower steel plate 7. The groove 17 is preferably less than the depth of the contaminants. The flexible edge could also be constructed from a thin, sharp strip of metal which is pressed into the soil to provide a seal. The lower plate could be bent downward at the edge 18 and placed in a groove or pressed into the soil. In another embodiment, a vertical metal plate 19 is inserted into the furrow and attached to a vertical section bent upward several inches above the heated part of the base plate. Being attached several inches above the base plate by a weld bead, 41, or a clamp, 42. This type of edge seal permits heating of the soil out to the edge of the base plate, a feature that permits remediation of soil adjacent to a paved asphalt or concrete surface. Alternatively, a short, flexible rubber skirt section 43, can be provided attached to the edge of the steel sheet by, for example, a bar-plate 44 running along the edge of the lower steel plate 7 being held tight against the lower steel plate by nuts 45 on studs 46 protruding upward from the lower steel plate. The flexible rubber skirt may be folded into the furrow, and backfilled with soil, or laid out extending far enough from the lower steel plate to provide a seal. When a rubber skirt is used the nearest heater should be about one foot from the edge to avoid overheating of the skirt.

Thermal Oxidizer

An incinerator may be provided to complete oxidation of contaminants within the vapors extracted from below the continuous metal sheet, but a thermal oxidizer is preferably provided for this purpose.

Although the heated soil and the areal blanket heater are generally effective in oxidization or pyrolysis of contaminants as they pass through, an additional thermal oxidizer 2 can be provided to complete oxidization of contaminates within the vapors extracted from under the continuous metal sheets. Without an effective thermal oxidizer, the vapors would be considerably more difficult and expensive to handle. Even though an in-line thermal oxidizer superficially resembles an incinerator, it differs from an incinerator in three distinct ways. First, fuel is not burned with the contaminants. Instead, dilute contaminants in the vapor, or oxygen-supplemented vapor, is heated separately by electric heaters or by external gas burners that are isolated from the contaminant stream. Second, the device is a simple gas phase reactor into which no solids or liquid products are introduced. This reduces the residence time requirement for essentially complete oxidation of contaminants. Third, the device does not vent its effluent directly into the atmosphere, rather it serves as an intermediate processor to reduce concentration of contaminants prior to their being trapped on a solid adsorbent 4.

The thermal oxidizer 2 may be placed in-line at the vacuum outlet 14 in the lower steel plate 7 of the thermal blanket. It can be attached directly to the lower plate, thereby fully utilizing the heat from the blanket heater. The oxidizer is constructed from a high temperature metal such as Incoloy 800H, Inconel 600, Inconel 601, etc., as is well known to one skilled in the art.

Referring now to FIGS. 7A through 7D, sectional views of principal components of a thermal oxidizer are shown. This thermal oxidizer is a three-pass device in which vapor flow from beneath the continuous metal sheet 7 is directed through a vacuum outlet 14 upward through parallel tubes 20, then downward in an annular region between the tubes 21, and finally directed upward through a single outlet tube 22, parallel to the inlet tubes 20. The entire tubular flow system is contained in a large diameter cylindrical outer shell 23 that is closed at both ends by welded bulkheads 24, 25. The inlet tubes 20 are welded to the lower bulkhead 24, and the outlet tube 22 is welded to the upper bulkhead 25. Concentric in each of the tubes are electric heaters 26, capable of operation at about 2000° F. Heaters having such capability are manufactured by Watlow Electric Manufacturing Company, St. Louis, Mo. The heaters are inserted into the inlet tubes through fittings 27 in the upper bulkhead 25. With this configuration, all of the tubulars and the heaters are free to expand axially without constraint, since each is fixed at only one end. This design avoids the intense thermal stresses that are generated by heating and cooling when both ends of the tubes are rigidly fastened to the outer shell.

Several inches of high-temperature, ceramic-fiber insulation 28 (not shown in FIGS. 7A through 7D) may surround the outer shell 23 and keep the thermal oxidizer assembly at an operating temperature that is only slightly below the surface temperature of the electric heater. An internal layer of insulation 29 above the lower bulkhead 24 may reduce cooling of the downward gas stream by the inlet stream as it changes flow direction at the bottom of the thermal oxidizer. It is important that the vapor stream be maintained at process temperature throughout a sufficient residence time within the thermal oxidizer to result in efficient oxidation of contaminants within the vapor stream.

At temperatures above 1800° F., radiation heat transfer to all the oxidized metal surfaces is very efficient. However, the major components of the vapor stream, nitrogen and oxygen, are symmetrical molecules and therefore not effectively heated by radiation. Addition of high surface area solids such as particles, beads, metal foils, strips, etc. will provide additional surface area for heat transfer to the vapor stream. Consequently, conduction and convection at the hot metallic surfaces is important in the design of the heater of the thermal oxidizer. Heat transfer into a gas stream is considerably more efficient in turbulent flow than in laminar flow. In the present design, gases are heated in the annular region between the inlet tubes and the electric heaters. High Reynolds numbers, approaching or achieving turbulent flow, can be achieved by reducing the diameter of the heater elements and the inlet tubes, or by adding roughness to the tubing walls. Alternatively, fixed blade flow mixers 30 such as those manufactured by Chemineer Inc., North Andover, Mass., may be added around the heater elements within the flow tubes. The mixers reverse the flow stream and mix the hot gases.

Typically, the residence time in the inlet tubes where the gases are heated is very short. The gases are then maintained at the process temperature for a longer time in the annular, downflow region, and again for a shorter time during upward flow in the exit tube. An overall residence time of about two seconds at 1800° F. is needed to assure complete destruction of most carbon-hydrogen and carbon-halogen bonds of contaminants. Addition of high surface area metallic or ceramic materials 31 that will absorb radiant energy and transfer that energy to the vapor stream will reduce the residence time needed for the reaction. Further, the high surface area metallic or ceramic materials 31 in the annular region of the oxidizer may also optionally be objects with surfaces coated with catalytic materials to further enhance thermal destruction of contaminants. The metallic or ceramic materials may, for example, be alumina or alumina having surfaces coated, or impregnated, with nickel, platinum, palladium, titanium oxide, or copper and manganese.

Figure 8:
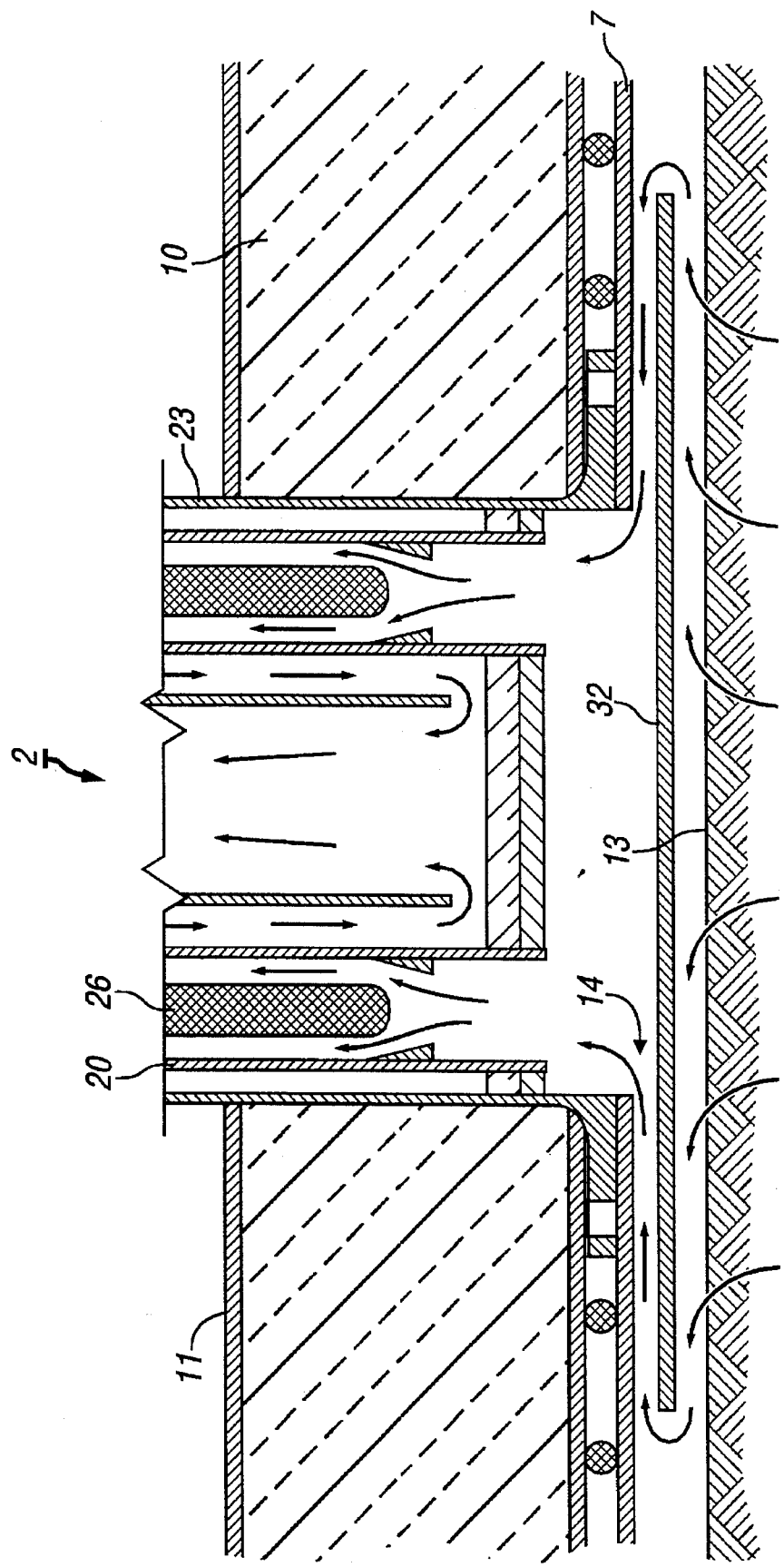
FIG. 8 is a schematic drawing of details of a preferred thermal blanket in the vicinity of the vacuum port.

Referring now to FIG. 8, an alternative thermal oxidizer is shown. This oxidizer is constructed to baffle the flow of vapors along the surface of the continuous metal sheet. This arrangement consists of a metal plate 32 underlying the continuous plate 7 in the vicinity of the vacuum port 14. The underlying plate 32 diverts the stream of vapors arising from the soil outward from the center of the sheet before returning it to the center by passing along to the high-temperature, continuous, heater-sheet.

The thermal oxidizer may be connected by metal piping to an activated charcoal bed. During operation, the activated charcoal bed is maintained above the dew point of the carrier vapor stream, where the carrier vapor stream is the vapor stream being removed from below the continuous metal sheet without the contaminants. This temperature could be below a temperature at which contaminants will condense. The contaminants are efficiently collected on an activated charcoal bed below a temperature at which the contaminants condense. When soil that contains water is remediated, the carrier vapor will consist of a considerable amount of water vapor with oxygen, nitrogen, and carbon dioxide. The charcoal bed, and the metal piping, is therefore preferably operated above the boiling point of water, 212° F. when soil containing water is remediated. The activated charcoal bed will adsorb contaminants not destroyed either in the soil 13, along the radiant heater lower plate 7, or in the thermal oxidizer 2. Operation of the activated charcoal 4 above 212° F. when water is present is preferred because this prevents liquid water from accumulating in the system, and avoids the need to treat the liquid water prior to discharge to the atmosphere when the water vapor is discharged in the vapor state.

Method of Operation

Operation of a radiant blanket heater of the present invention, with an in-line thermal oxidizer, vapor phase vacuum collection system, and solid adsorbent may be carried out as follows:

1) The radiant heater assembly 1 is placed on the surface and any additional equipment is arranged in the manner displayed in FIG. 1.

2) The in-line thermal oxidizer 2 is energized and brought up to its operational temperature.

3) The vacuum blowers 5 are started at a low air flow rate.

4) The blanket heater 1 is energized at the maximum power allowed by the heater rating, and the available power supply.

5) As the temperature in the soil rises, the vapor flow rate through the vacuum system is adjusted so that any vapors generated below the blanket heater are collected into the vacuum system rather than allowed to escape into the atmosphere at the edge of the blanket. Control may be maintained by monitoring pressure with pressure sensors at the outer edge of the sheet to maintain a subatmoshperic pressure in the volume between the surface and the continuous metal sheet of the heater.

6) The temperature of the vacuum system is maintained above the boiling point of any products exiting the in-line thermal oxidizer 4. Although high temperatures are acceptable in the upstream parts of the vacuum system, the solid adsorbents must be kept at a lower temperature and preferably at a temperature just above the dew point of the vapor stream. Adsorbents such as activated carbon generally become less effective at elevated temperatures and operation of the adsorbent just above the dew point temperature of the vapor stream will result in better utilization of the adsorbent than operation at a higher temperature. For a vapor stream composed of air, water, carbon dioxide, and minor amounts of hydrogen chloride and carbon monoxide, a temperature of about 220° F. is sufficient to maintain a vapor phase and is therefore preferred.

7) The length of time required to remediate soil is dependent on a number of factors including: the depth of contamination, the boiling point of the contaminants, the thermal diffusivity of the soil, the water content of the soil, and the operating temperature of the heater. Typically, a single heating cycle to recover a 500° F. boiling point contaminant that is six inches into the soil is accomplished in less than one day.

8) Thermocouples placed in the soil under the heater blanket may be used to determine when the soil has been heated sufficiently based on a criteria of reaching a temperature that exceeds an acceptable vapor pressure of the contaminates at that depth. The proper sequence of shut-down is preferably: a) switch off the blanket heater, b) reduce the air flow rate while maintaining a rate sufficient to prevent vapors from escaping at the edge of the sheet, c) when the air rate has been reduced to zero, switch off the in-line thermal oxidizer, d) circulate air through the oxidizer to hasten cooling, and e) when cool, move the equipment to the next location.

Another arrangement of heater and mode of operation is useful for remediating contaminated soils and objects that are not easily covered insitu by a heater. For example, soil around buildings, piping, trees, or irregular or rocky surfaces may not be amenable to remediation insitu. In these situations, the present invention may be applied by preparing a surface or shallow pit into which excavated soil or objects can be placed for remediation, and the heater of the present invention placed over the soil or objects to be remediated. The contaminated soil can then be remediated by the process of the present invention as if it were insitu. Although a major advantage of other embodiments of the present invention, that contaminated soil does not have to be moved, is not realized, the movement of the soil is minimized by utilizing a shallow pit that can be prepared convenient to the location of the contaminated soil.

Figure 10:
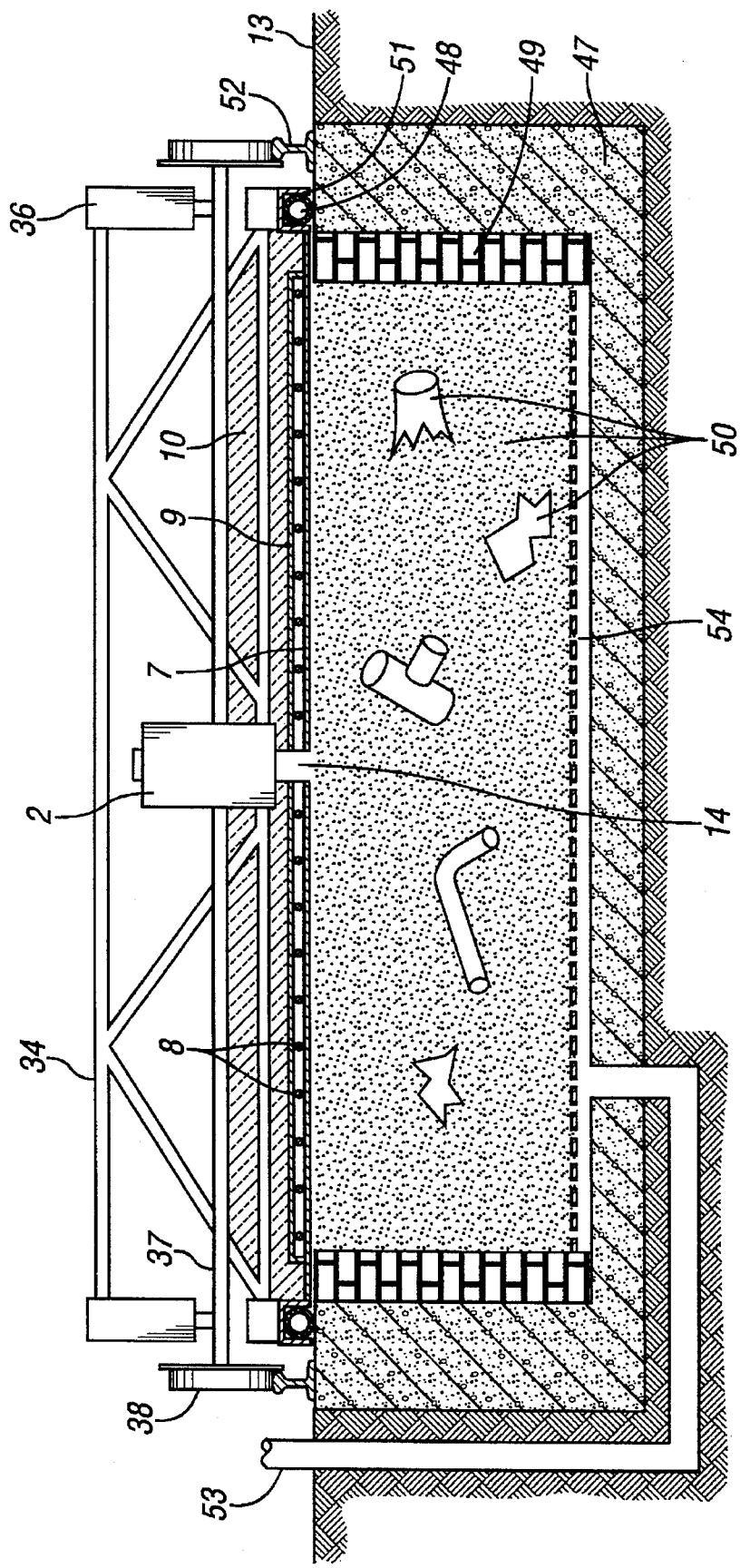
FIG. 10 is a sectional view of a site and heater in an alternative implementation of the present invention.

Referring now to FIG. 10, an embodiment of the present invention is shown wherein a shallow pit is prepared for remediation according to the present invention. The pit shown is excavated and lined at the bottom and sides with thermal insulation and a vapor seal 47. This lining can be constructed, for example, from vermiculite cement, or from sheet steel insulated with firebrick 49. A movable structure 34 is mounted on rails 52 and may be raised with jacks 36. The jacks are effective to, when extended, transfer the weight of the heater to axles 37 and wheels 38. This structure also contains an insulation layer 10. The heater assembly 8 is loosely hung from this structure and a lower plate 7 is the continuous metal sheet of the present invention. A volume under the continuous metal sheet is isolated from the surrounding atmosphere by an inflatable rubber tubing 48. The tubing is contained under a U-member 51 that borders the structure. Vapors can be removed from below the continuous metal sheet through a port 14 and treated in a thermal oxidizer 2 that is supported by the structure 34. A perforated plate 54 is shown at the bottom of the pit with a conduit 53 capable of communicating vapors to or from under the perforated plate. The conduit 53 and perforated plate 54 can be used as a means to remove vapors from the volume under the continuous metal sheet either along with or instead of the port 14. The conduit 53 and perforated plate 54 can also be used, for example, as a means to supply air or steam for contact with dirt or debris being remediated either for oxidation or steam stripping of contaminants.

Soil and/or debris to be remediated are placed in the pit 50. With an efficient radiant heater it will not be necessary to fill the pit completely; however, if the pit is not filled, the lower plate may require support to withstand a load created by a subatmospheric pressure below the lower plate. Next, the structure is moved into position over the pit and lowered by retracting the jacking devices 36 to the position shown in FIG. 10, in which weight of the heater rests on the outer part of the U-members 51. The inflatable tubing 48 is inflated and vapors below the heater assembly are removed through a port 14 and the heater is activated to initiate heating of the soil within the pit. When a time and temperature has been reached that is effective in removing contaminates from the soil, the heater is deactivated, and the removal of vapors from below the heater assembly is discontinued. The inflatable tubing is then deflated and the jacks are extended to raise the heater assembly and the heater assembly is moved away from the pit. A second pit could be available situated so that the heater assembly could be moved from one pit to the second so that it can be in constant use while contaminated soil is placed in the pits, allowed to cool and removed.

Heating efficiency of this arrangement is better than insitu soil heating from the surface because the basal vapor barrier shields the remediation zone from migration of ground water, and the insulation at the base of the pit minimizes downward heat losses. Other configurations can further improve thermal efficiency by: (1) locating heaters at the base of the pit, (2) providing vertical convection paths for a vapor stream away from the heater across the soil into a vapor gathering system, or (3) installing two pits with flow paths for heat recovery by convective transport between them.

Conductive transfer may be provided, for example, by using two pits adjacent to each other and providing conduits 53 that provide communication between the two pits. Such conduit is preferably provided with a valve. Heated, remediated material within one pit could be used as a heat source for heating material in the other pit by pulling air through the heated material, through the conduit 53, and to below the material in the other pit.

Considerations of Heater Size

Factors which determine the preferred heater blanket size are: (a) the power requirement during initial heating and during constant surface temperature heating, (b) the amount of overlap needed at the edges of each set, (c) fabrication costs and materials available, and (d) time and effort required to move the blanket.

Large heaters offer advantages of diminishing the number of moves required, and reducing the amount of overlap heating. Small heaters are easier to handle and move, and also are less disruptive in the event of an equipment failure. Power requirements vary with specific soil properties and conditions; however, a typical power requirement for initial start-up heating is 1000 watts/square foot of surface, and for steady state heating about 500 watts/ square foot. For example, if power availability is two megawatts, a total of 4000 square feet of surface could be treated at one time. Minimizing the vertical heat losses with thick insulation would allow an acceptable heating rate with considerably lower steady-state power, possibly as low as 300 watts/ square foot.

To assure complete removal of contaminants near the edge of the heater blanket, successive blanket positions on the surface must overlap the previous ones. For one foot of overlap, a 40'×50' heater would have a loss in heating efficiency of 9%, whereas a 20'×50' heater would have a 14% loss. If a two foot overlap is used, these efficiency losses are 18% and 28% respectively.

To fabricate a large stainless steel plate, long butt welds will be needed because the maximum width of commercially available sheet steel is six feet wide. Fortunately, the length is not so constrained because both sheet steel and the mineral-insulated heaters are generally available in 200 foot lengths.

Figure 9:
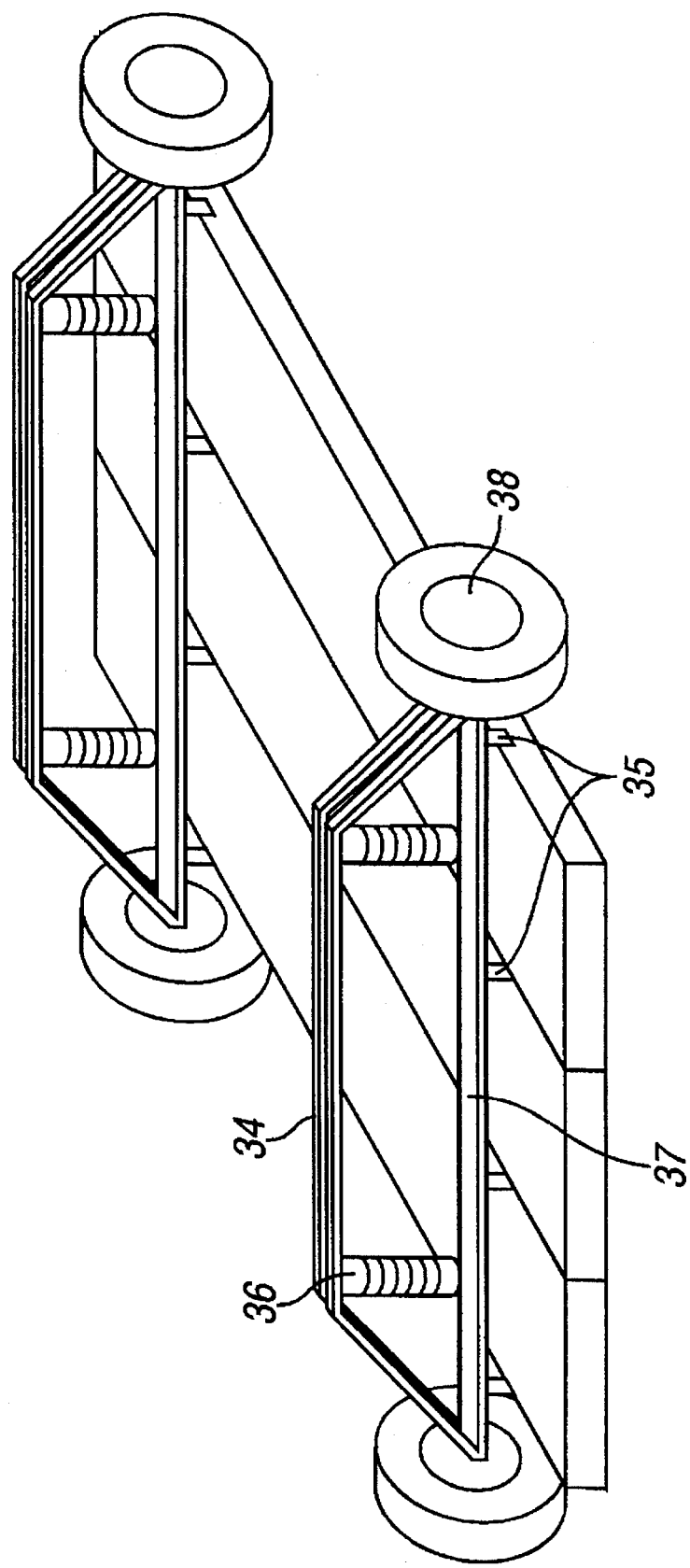
FIG. 9 shows a device for moving a very large heater blanket assembly from one remediation site location to another.

Two methods of heater blanket movement are: (1) lift and translate, or (2) drag. Lifting can be carried out with conventional cranes or "gin pole" trucks, or with a special spanning structure, such as shown in FIG. 9. For large areal heaters, structure required to stiffen them sufficiently for lifting becomes burdensome For heater widths less than 40', simple bar joists 34 can be used to span the short dimension and attach to the heater blanket assembly with hooks 35. Jacking devices 36 are attached to axles 37 of wheels 38 that are mounted at the ends of each joist. The jacking devices could be used to elevate the heater assembly just enough to clear the surface. In one embodiment, applicable to fairly flat surfaces, the heater blanket assembly is constructed of a group of modules each fabricated as a sheet steel box about 4'×20'×1'. The boxes contain the loose insulation 10, hold the heaters 15 and reflectors 9, and serve as the lower plate 7. This design provides easy access to the heaters for maintenance or replacement, and the structure could provide a platform for the thermal oxidizer and other downstream equipment. Although large heaters are relatively heavy, the loading per unit of surface area is not large and the heater may advantageously be dragged rather than lifted from one remediation area to another.

If necessary, metal guides or some open woven material such as a chain-link fencing could be staked down to reduce the drag forces when the radiant heater of the present invention is moved by pulling along the ground. Depending on the conformance of the plate to the soil, it may be beneficial to have a high permeability spacer, such as a wire mesh, furnace belt, or chain link fence material, under the lower plate to allow gases to flow freely to the vacuum port.

Other variations of the preferred embodiment may be apparent, and reference is made to the following claims to determine the full scope of the present invention.

We claim:

1. A radiant plate surface heater for remediation of contamination near a contaminated surface, the heater comprising:
   a) a continuous metal sheet effective to radiate heat to the contaminated surface, said continuous metal sheet having a bottom face, a top face, and a sheet edge;
   b) means for heating the continuous metal sheet;
   c) insulation occupying a volume above the continuous metal sheet;
   d) a baffle system to maintain a subatmospheric pressure below the continuous metal sheet, which baffle system removes vapors from below the continuous metal sheet by routing the vapors first along the bottom face of the continuous metal sheet, over the sheet edge, and subsequently along the top face of the continuous metal sheet; and
   e) a vapor barrier effective to prevent significant leakage to the volume occupied by the insulation.

2. A method of removing contaminants near a contaminated surface, the method comprising the steps of:
   providing a radiant plate surface heater for remediation of contamination near a surface, the heater comprising,
   a) a continuous metal sheet effective to radiate heat to the contaminated surface, said continuous metal sheet having a bottom face, a top face, and a sheet edge,
   b) a means for heating the continuous metal sheet,
   c) insulation occupying a volume above the continuous metal sheet,
   d) a vapor barrier effective to prevent significant leakage to the volume occupied by the insulation; and
   e) a thermal oxidizer effective to oxidize a significant portion of any contaminants in vapors removed from below the continuous metal sheet;
   placing the radiant plate surface heater above the surface from which contaminants are to be removed;
   heating the contaminated surface using the heater;
   removing vapors from below the continuous metal sheet at a rate sufficient to maintain a subatmospheric pressure below the continuous metal sheet;
   routing the vapors from below the continuous metal sheet through a baffle prior to oxidation by passing the vapors first along the bottom face of the continuous metal sheet, over the sheet edge, and subsequently along the top face of the continuous metal sheet;
   removing contaminants from the vapors removed from below the continuous metal sheet;
   initiating thermal oxidation or pyrolysis of the contaminants; and
   venting to the atmosphere vapors removed from below the continuous metal sheet after contaminants are removed therefrom.

* * * * *